United States Patent
Aoyagi (10) Patent No.: US 7,568,033 B2
(45) Date of Patent: Jul. 28, 2009

(54) IMAGE STORAGE SYSTEM AND IMAGE ACCUMULATION APPARATUS

(75) Inventor: Yoshiro Aoyagi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 1060 days.

(21) Appl. No.: 10/267,736

(22) Filed: Oct. 10, 2002

(65) Prior Publication Data

US 2003/0071900 A1    Apr. 17, 2003

(30) Foreign Application Priority Data

Oct. 12, 2001   (JP)   ............. P. 2001-315314
Oct. 12, 2001   (JP)   ............. P. 2001-315315

(51) Int. Cl.
*G06F 15/173* (2006.01)
(52) U.S. Cl. .......................... 709/226
(58) Field of Classification Search .......... 709/226
See application file for complete search history.

(56) References Cited

U.S. PATENT DOCUMENTS

| | | | |
|---|---|---|---|
| 5,758,057 A | | 5/1998 | Baba et al. |
| 6,222,547 B1 * | | 4/2001 | Schwuttke et al. .......... 345/419 |
| 6,636,259 B1 * | | 10/2003 | Anderson et al. ......... 348/211.3 |
| 6,832,248 B1 * | | 12/2004 | Byrnes ....................... 709/223 |
| 6,988,087 B2 * | | 1/2006 | Kanai et al. .................... 705/80 |
| 7,017,016 B2 * | | 3/2006 | Chujo et al. ................. 711/147 |
| 2001/0037271 A1 * | | 11/2001 | Kubota ........................ 705/34 |
| 2002/0198936 A1 * | | 12/2002 | McIntyre et al. ........... 709/203 |

FOREIGN PATENT DOCUMENTS

| | | |
|---|---|---|
| JP | 06-113016 A | 4/1994 |
| JP | 7-311799 A | 11/1995 |
| JP | 09-69027 A | 3/1997 |
| JP | 11-224228 A | 8/1999 |

OTHER PUBLICATIONS

Junji Kawakami et al.: "Way of Internet practice,—Increase of sales, Reduction in cost, and Increase efficiency—, the latest case examples of 21 companies," Nikkei IT 21, Nikkei Business Publications, Inc., Jul. 2001, vol. 1, No. 1, pp. 48-61.
Japanese Office Action dated Apr. 22, 2009.

* cited by examiner

*Primary Examiner*—Andrew Caldwell
*Assistant Examiner*—Christopher Biagini
(74) *Attorney, Agent, or Firm*—Sughrue Mion, PLLC

(57) ABSTRACT

An image accumulation server has a storage area management section for managing a storage area of an image storage section and a customer information management section for managing customer information. The storage area is set to reserve a predetermined capacity as the initial state for one customer and after the expiration of a predetermined time period, the service providing contents for each customer including the storage area and usage charge in the next predetermined time period are again set in response to the customer information. If an unused area exists, in the next predetermined time period, the storage area is decreased and the usage charge is reduced or is made free of, or the storage area is decreased as much as the capacity corresponding to the usage charge, so that a part of the unused storage area is canceled as an equivalent for the usage charge.

15 Claims, 9 Drawing Sheets

FIG. 3

| 1 | USER NAME |
|---|---|
| 2 | USER ID |
| 3 | PASSWORD |
| 4 | E-MAIL ADDRESS |
| 5 | BIRTHDAY |
| 6 | NUMBER OF MOST RECENT ACCESS TIMES TO SERVER/MONTH |
| 7 | AVERAGE NUMBER OF ACCESS TIMES A MONTH |
| 8 | NUMBER OF ACCESS TIMES IN THIS MONTH |
| 9 | MAXIMUM NUMBER OF ACCESS TIMES IN PAST A MONTH |
| 10 | MINIMUM NUMBER OF ACCESS TIMES IN PAST A MONTH |
| 11 | INCREASE/DECREASE TREND (INCLINATION) OF NUMBER OF ACCESS TIMES IN MOST RECENT THREE MONTHS |
| 12 | INCREASE/DECREASE TREND (INCLINATION) OF NUMBER OF ACCESS TIMES IN MOST RECENT SIX MONTHS |
| 13 | CUMULATIVE NUMBER OF ACCESS TIMES |
| 14 | DATE AND TIME AT WHICH SERVER WAS ACCESSED LAST |
| 15 | NUMBER OF WRITTEN IMAGES (CAPACITY)/MONTH |
| 16 | AVERAGE NUMBER OF WRITTEN IMAGES (CAPACITY) A MONTH |
| 17 | NUMBER OF WRITTEN IMAGES (CAPACITY) THIS MONTH |
| 18 | MAXIMUM NUMBER OF WRITTEN IMAGES IN PAST (CAPACITY) A MONTH |
| 19 | MINIMUM NUMBER OF WRITTEN IMAGES IN PAST (CAPACITY) A MONTH |
| 20 | INCREASE/DECREASE TREND (INCLINATION) OF NUMBER OF WRITTEN IMAGES (CAPACITY) IN MOST RECENT THREE MONTHS |
| 21 | INCREASE/DECREASE TREND (INCLINATION) OF NUMBER OF WRITTEN IMAGES (CAPACITY) IN MOST RECENT SIX MONTHS |
| 22 | CUMULATIVE NUMBER OF WRITTEN IMAGES (CAPACITY) |
| 23 | MAXIMUM FILE CAPACITY OF ONE FILE AMONG FILES WRITTEN IN PAST |
| 24 | MINIMUM FILE CAPACITY OF ONE FILE AMONG FILES WRITTEN IN PAST |
| 25 | AVERAGE CAPACITY OF FILES WRITTEN IN PAST |
| 26 | SETUP CAPACITY OF STORAGE AREA |
| 27 | NUMBER OF PRINT SERVICE USE TIMES |
| 28 | NUMBER OF IMAGE PROCESSING SERVICE USE TIMES |

IMAGE STORAGE SYSTEM AND IMAGE ACCUMULATION APPARATUS

BACKGROUND OF THE INVENTION

1. Field of the Invention

This invention relates to an image storage system for accumulating and storing customer's image information transferred over a communication line. This invention also relates to an image accumulation apparatus for accumulating customer's image information transferred over a communication line.

2. Description of the Related Art

Hitherto, image information provided by taking a photograph by an image input machine such as a digital camera has been transferred from internal memory of the image input machine to a personal computer of the user and recorded on a large-capacity record medium such as a hard disk or a CD-R for retention. If a hard copy is required, hard copy output has been produced on a printer connected to the personal computer or the user has brought the record medium into a shop or has used a network to provide the image information and has made a print request. However, to retain the image information in the personal computer, there has been the cost of providing a large-capacity record medium and it has taken time in managing the image information. For the user to print for himself or herself, there have also been the disadvantages that it takes cost and time in providing a printer and paper and that operation is not easy.

Recently, service has been designed for making it possible for a trader to operate an image accumulation server, for a customer to transfer image information from his or her personal computer or a terminal, etc., installed in a shop, etc., to the server, to accumulate the image information in the server, and perform image processing, print, etc.

In the image accumulation service system as described above, to allocate a record area for each customer and retain image information, if an attempt is made to reserve a given amount of record area at the user registration time of the customer as a general Internet service provider allocates a storage area of home page and electronic mail data to each user, an unused area in which the customer does not retain data occurs because not all customers maximize the use of allocated record areas. In such a case, the unused areas in the server are wasted and the customer pays usage charge containing the unused area regardless of the actually retained data amount; on the other hand, for the trader, the use efficiency of the record areas in the server worsens. Thus, there is a problem of impossibility of appropriately managing the storage areas and customer information in response to the application, purpose, use situation, etc., of the customer.

Furthermore, for example, image information of images photographed by digital cameras differs in image data resolution (the number of pixels) because the digital cameras differ in the number of pixels of the image pickup device, photographing mode, etc., and the data amount per image may vary largely. Thus, in the image accumulation service system as described above, the necessary capacity of the record area to be provided by the server varies depending on the resolution of the image data transferred from the user. If an attempt is made to reserve a given amount of record area in the server, the number of images that can be retained varies depending on the resolution of the image data, and the record area is insufficient for the number of retained images, required by the user (the capacity is exceeded); in contrast, the record area becomes drastically surplus. This point is a problem.

SUMMARY OF THE INVENTION

It is therefore an object of the invention to provide an image storage system for making it possible to finely and appropriately set and manage the capacity of a storage area, charge payment, and others in response to the use situation, etc., of a customer. Moreover, another object of the invention to provide an image accumulation apparatus for making it possible to appropriately set the capacity of a storage area in response to the type of machine connected, the resolution of transferred image data, etc., and ensure a predetermined number of retained images.

According to the invention, there is provided an image storage system comprising an image accumulation server including an image storage section for recording image information, the image storage system for storing image information transferred via a communication line in the image storage section, wherein the image accumulation server has a storage area management section for managing a storage area of the image storage section and a customer information management section for managing customer information concerning a customer making a request for storing the image information, and wherein the storage area management section sets the storage area so as to reserve a predetermined capacity for one customer as the initial state to store the image information and after the expiration of a predetermined time period, again sets the service providing contents for each customer including the storage area and usage charge in the next predetermined time period in response to the customer information.

The storage area management section uses a retention history of image information as the customer information and if the used area in which image information is retained is smaller than the storage area, the storage area management section decreases the storage area in the next predetermined time period and reduces or makes free of the usage charge in the next predetermined time period.

The storage area management section uses a retention history of image information as the customer information and after the expiration of the predetermined time period, decreases the storage area in the next predetermined time period as much as the capacity corresponding to the usage charge.

The storage area management section uses an image-related service order history including at least either of image information print service and image processing service as the customer information and if predetermined image-related service is used after the expiration of the predetermined time period, the storage area management section increases the storage area in the next predetermined time period or reduces the usage charge in the next predetermined time period.

The customer information management section updates the customer information based on the service providing contents again set with at least either of the storage area and the usage charge changed by the storage area management section.

In the configuration, after the storage area is set so as to reserve the predetermined capacity for one customer as the initial state, at the expiration of the predetermined time period, the service providing contents for each customer including the storage area and usage charge in the next predetermined time period are again set in response to the customer information, whereby it is made possible to finely and appropriately set and manage the capacity of the storage area, charge payment, and others in response to the use situation, etc., of the customer.

For example, the storage area in the next predetermined time period is decreased and the usage charge in the next predetermined time period is reduced or is made free of, or the storage area is decreased as much as the capacity corresponding to the usage charge, so that a part of the unused storage area can be canceled as an equivalent for the usage charge, the cost load on the customer can be lightened, area allocation for image retention can be conducted efficiently, and the use efficiency of the resources of the image storage section in the image accumulation server is enhanced. If image-related service such as image information print service or image processing service is used, the storage area is increased or the usage charge is decreased, whereby a bonus for the service use is given to the customer and the trader can obtain customers and get an equivalent by providing retention management, print service, processing service, etc., of the image data.

According to the invention, there is provided an image accumulation apparatus for retaining image information transferred via a communication line in an image storage section, the image accumulation apparatus comprising a storage area management section for managing a storage area of the image storage section and a customer information management section for managing customer information concerning a customer making a request for storing the image information, wherein the storage area management section acquires the maximum number of pixels of the image information, calculates the data capacity required for ensuring a predetermined number of images that can be retained for one customer from the maximum number of pixels, and sets the storage area.

The storage area management section acquires machine information of the image input machine of the transfer source of the image information and obtains the maximum number of pixels of the image information based on the machine information.

The storage area management section acquires machine information of the image input machine used by the customer of the transfer source of the image information from the customer information and obtains the maximum number of pixels of the image information based on the machine information.

The storage area management section acquires machine information of the image input machine preparing the image information from the attached information to the image information and obtains the maximum number of pixels of the image information based on the machine information.

If the machine information corresponding to the customer information of a predetermined customer stored in the customer information management section differs from the acquired machine information, the storage area management section again sets the storage area based on the acquired machine information.

In the configuration, to transfer image data from an image input machine such as a digital camera for retention, the maximum number of pixels of the transferred image information is acquired, the data capacity required for ensuring a predetermined number of images that can be retained is calculated from the maximum number of pixels, and the storage area of the image storage section is set. For example, the machine information of the image input machine is acquired, the model of the image input machine, etc., is determined, the maximum number of pixels of the image information formed by photographing by the image input machine or the image information sent from the image input machine of the transfer source is grasped, and the necessary storage area capacity is reserved.

Accordingly, the optimum storage area capacity can be set in response to the situation of the customer and area allocation for image retention can be conducted efficiently and the use efficiency of the resources of the image storage section in the image accumulation server can be enhanced while a predetermined number of retained images are ensured. The customer need not calculate the capacity of the image data when making a request for storing the image data, and can accumulate the image information up to the preset number of images that can be retained based on the number of images that can be understood easily by intuition.

In the above figures, the reference numerals 11 and 111 refer to image accumulation servers; 12 and 112 to terminals; 13 and 113 to networks; 21, 31, 121, 131, and 135 to communication interfaces; 22 and 122 to image storage sections; 24 to a customer information storage section; 25 and 125 to customer information management sections; 26 and 126 to control sections; 32 and 132 to monitors; 33 and 133 to memories; 34 and 134 to control sections; 35 to an input/output section; 36 and 136 to operation input sections; 114 to a digital camera; 115 to a camera ID; and 123 to a storage area management section.

DETAILED DESCRIPTION OF THE PREFERRED EMBODIMENTS

Referring now to the accompanying drawings, there is shown a preferred embodiment of the invention.

Figure 1:
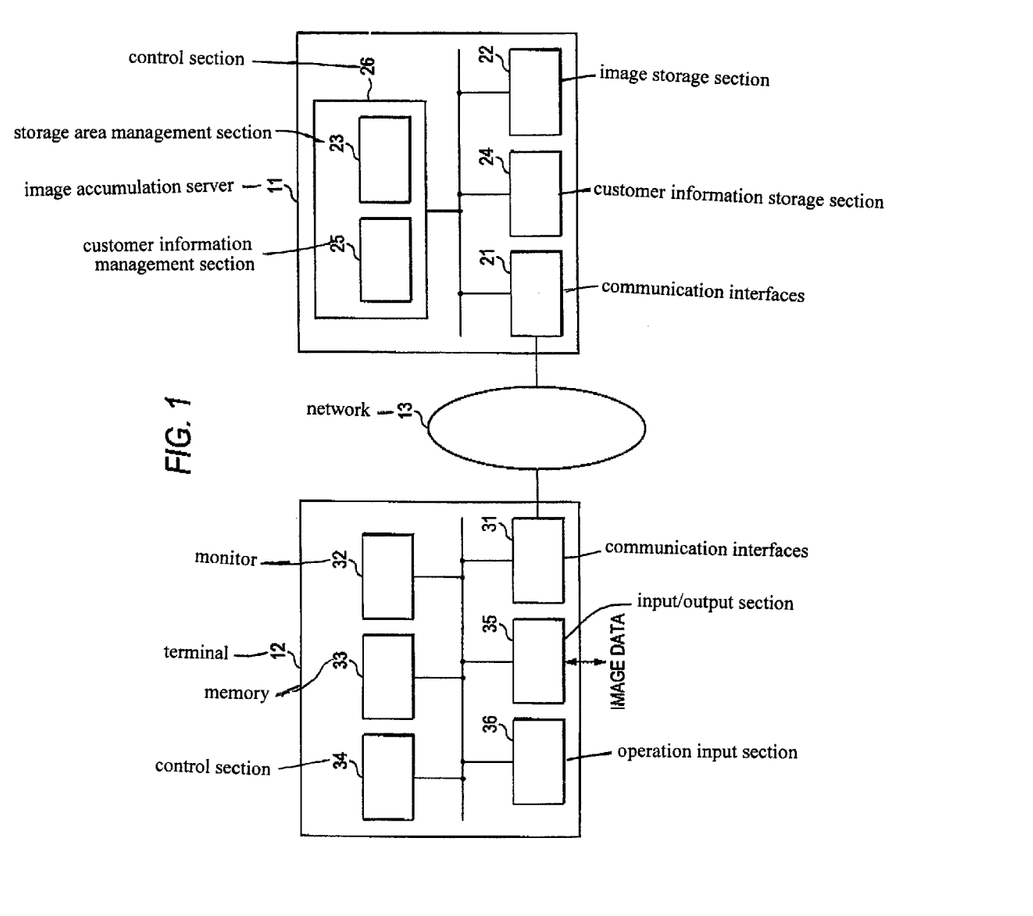
FIG. 1 is a block diagram to show the schematic configuration of an image storage system according to one embodiment of the invention.

FIG. 1 is a block diagram to show the schematic configuration of an image storage system according to one embodiment of the invention. The embodiment provides an example of a system wherein data of an image photographed by a digital camera is transferred through a network to a server for retention.

The image storage system of the embodiment has an image accumulation server 11 for accumulating image data. The image accumulation server 11 is connected to a terminal 12 of a personal computer used by the user, an acceptance terminal installed in a shop, etc., or the like through a network 13 such as the Internet of a communication line.

An image accumulation server 11 comprises a communication interface 21 being connected to a network 13 for conducting data communications, an image storage section 22 for accumulating and retaining image data, a customer information storage section 24 for recording customer information such as the service contract contents and use history of each customer, and a control section 26 for controlling the sections. The control section 26 has a storage area management section 23 for setting and managing a storage area for each customer in the image storage section 22 and a customer information management section 25 for setting, changing, managing, etc., the customer information.

The terminal 12 comprises a communication interface 31 being connected to the network 13 for conducting data communications, a monitor 32 of a liquid crystal display panel (LCD), etch, for displaying the operation state, etc., memory 33 for temporarily storing image data, etc., a control section 34 for controlling the sections, an input/output section 35 for inputting/outputting image data, and an input operation section 36 for entering an operation command. The terminal 12 capable to be connected to a digital camera, recording medium, which is a memory card or such, in order to input image data to the terminal 12.

In the embodiment, user registration of each customer receiving the image accumulation service is conducted and customer information is recorded in the customer information storage section 24 of the image accumulation server 11. The customer information includes not only personal information of the name, address, etc., of the customer, but also information for each customer concerning image accumulation service providing, such as the storage area capacity, the capacity of stored image data, and the number of accesses. The image data transferred through the network 13 from a terminal 12 is recorded and retained in the storage area set for each customer in the image storage section 22 of the image accumulation server 11.

For a newly registered customer, a predetermined amount of storage area is reserved as the initial state by the storage area management section 23 of the control section 26, and the terminal 12 is notified of the fact. The terminal 12 transfers image data within the range of the setup capacity in accordance with the capacity of the storage area set for the customer. If the image data exceeding the setup capacity exists in the terminal 12 or is sent to the image accumulation server 11, an image selection screen is prepared in the terminal 12 or the image accumulation server 11 and is displayed on a monitor 32 of the terminal 12, prompting the customer to select a predetermined number of images to be retained.

In the image accumulation service, to use the storage area allocated to the image storage section 22 to retain the image data, usage charge shall occur every predetermined time period for the capacity of the storage area and the customer shall pay the usage charge to the trader. At the expiration of the predetermined time period of one month, etc., after service use was started, the customer information management section 25 of the control section 26 reads the customer information of the customer from the customer information storage section 24 and determines the service providing contents of the capacity of the storage area, the usage charge, etc., in the next predetermined time period in response to the use history of the capacity of the retained image data (capacity of used area), the retention history of the image data, the service order history of print service, etc., and the like. The storage area management section 23 sets the storage area of the customer for reserving the again set capacity in the image storage section 22.

For example, if the used area in which the image data is retained is small as compared with the currently set storage area, the storage area is decreased in the next predetermined time period. Accordingly, the usage charge for the decrease in the retention capacity of the image data can be reduced or made free of in the next predetermined time period, and the cost load on the customer can be lightened. That is, considering the capacity of the storage area in the image storage section 22 of the image accumulation server 11 to be an equivalent for the usage charge, it is made possible to set the appropriate storage area and usage charge in response to each customer for administration.

Figure 2:
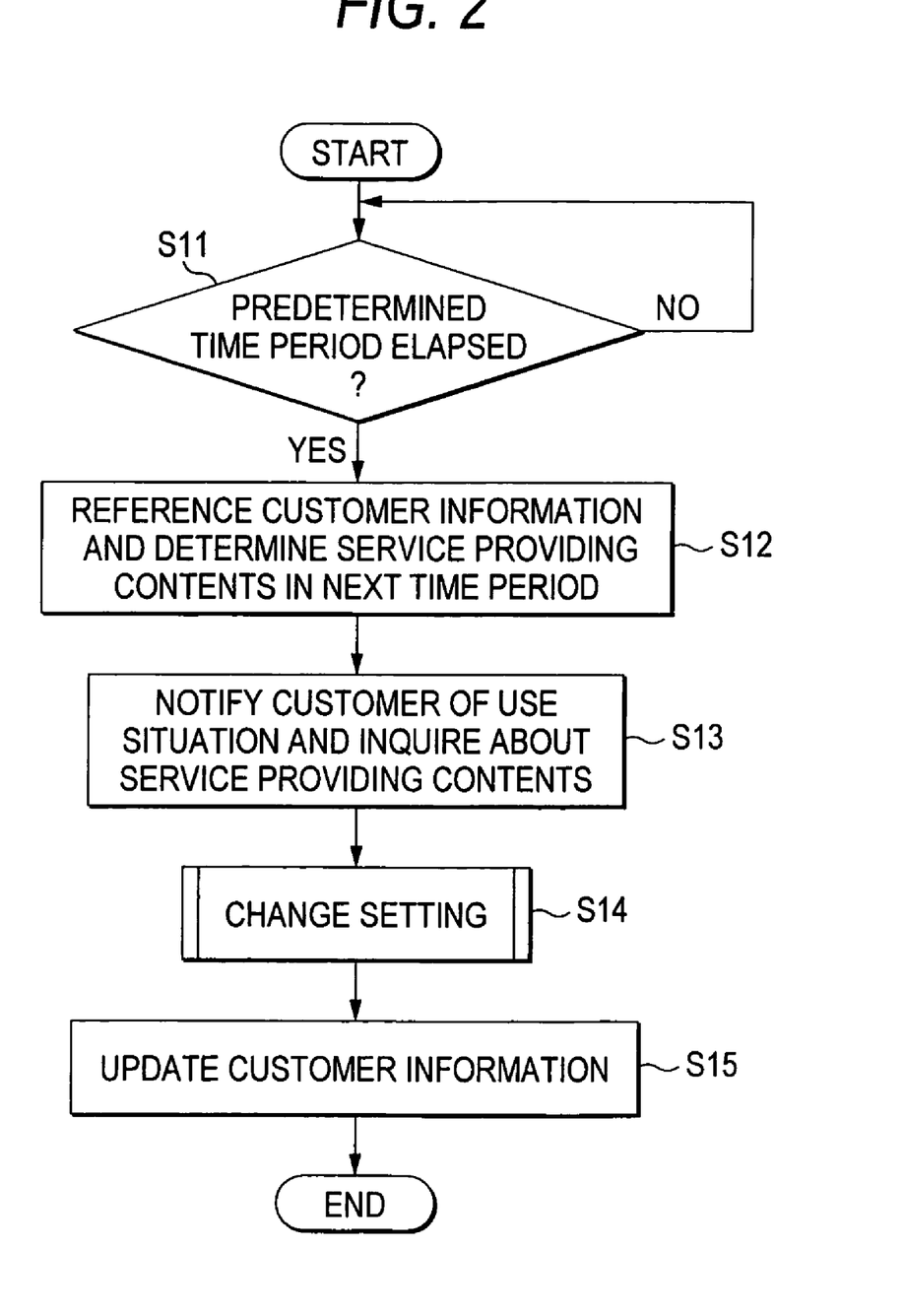
FIG. 2 is a flowchart to show a schematic procedure of setting customer information every predetermined time period.

Next, the operation of the image storage system of the embodiment will be discussed. FIG. 2 is a flowchart to show a schematic procedure of setting customer information every predetermined time period. The operation description to follow centers around the operation of the control section 26 in the image accumulation server 11.

At the expiration of a predetermined time period (for example, one month) of separation of the use time period such as the contract timer period after user registration was conducted, a storage area was set, and the image accumulation service was provided for one customer (step S11), the customer information management section 25 references the customer information in the customer information storage section 24 and appropriately determines the service providing contents of the capacity of the storage area, the usage charge, etc., in the next predetermined time period in response to the use history (step S12). The customer information management section 25 transmits the use history information and the service providing contents information to the terminal 12, notifies the customer of the service use situation, gives advice on the contract contents to the customer, and inquires of the customer if he or she changes to the newly setup service providing contents (step S13).

At this time, the use situation is displayed on the monitor 32 of the terminal 12 for accepting customer's response entry through an operation input section 36. The response information from the customer is transferred to the image accumulation server 11, and the customer information management section 25 changes the setting concerning the service providing contents in response to the response information (step S14). The customer information management section 25 updates the customer information and records the updated customer information in the customer information storage section 24 (step S15). To change the capacity of the storage area in the image storage section 22, the storage area management section 23 changes the area setting and again sets the storage area of the customer.

Figure 3:
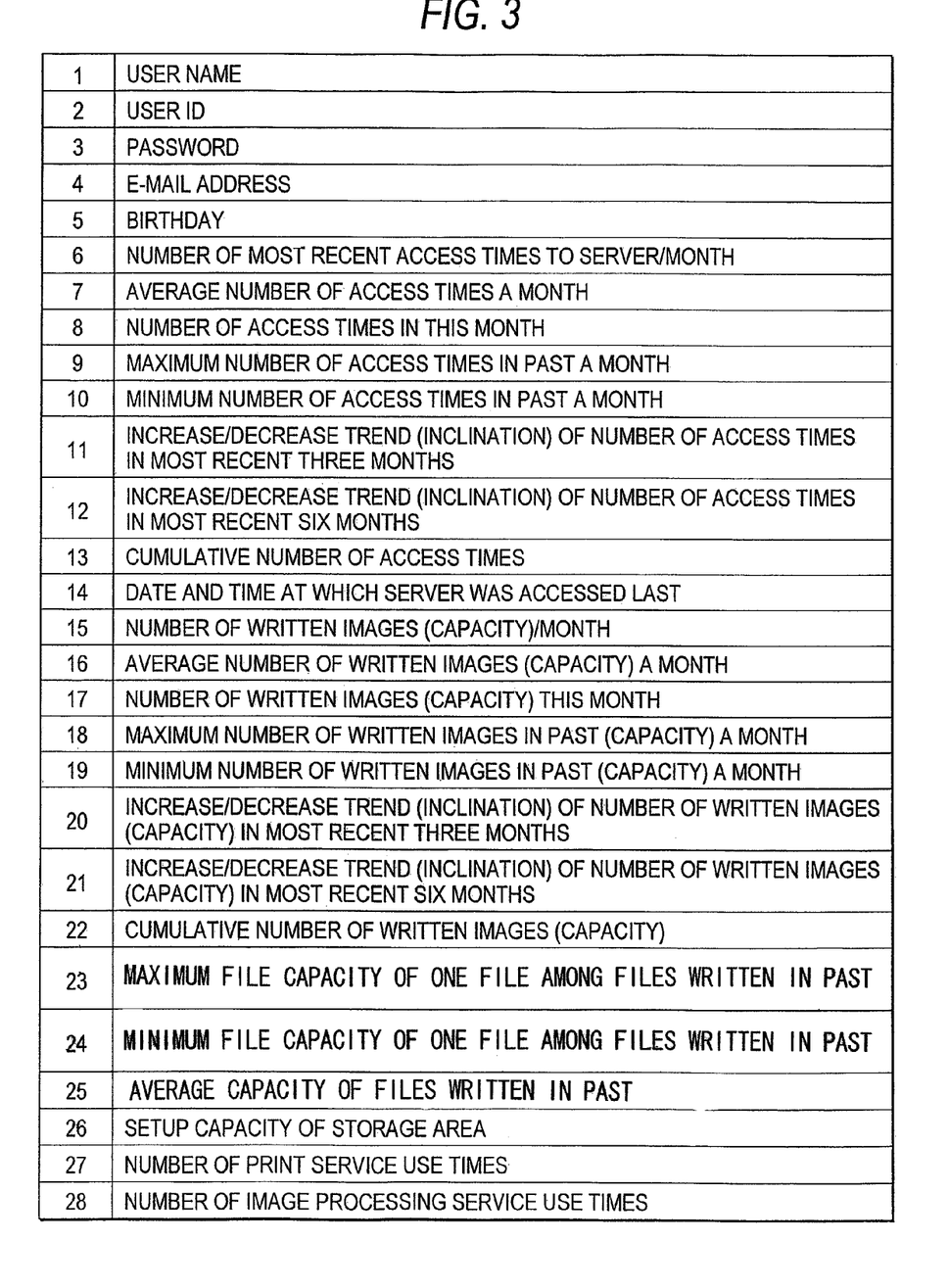
FIG. 3 is a drawing to show an example of customer information.

FIG. 3 is a drawing to show an example of the customer information. The customer information includes various pieces of information concerning the use of the image accumulation service, such as personal information of the user name, etc., the number of access times to the image accumulation server 11, the number of written images (capacity), the capacity per file of written image data, the setup capacity of the storage area, and the number of service use times of print service, image processing service, etc., which are recorded in the customer information storage section 24 in the form of a table, etc.

Based on the customer information, for example, the total capacity of the current image data retained by the customer can be found from the image write capacity, the service use frequency can be seen from the number of access times to the image accumulation server 11, and these pieces of information and the capacity per file of image data, etc., can also be totalized for estimating the capacity of the storage area which will be required for the customer in the later predetermined time period.

Figure 4A:
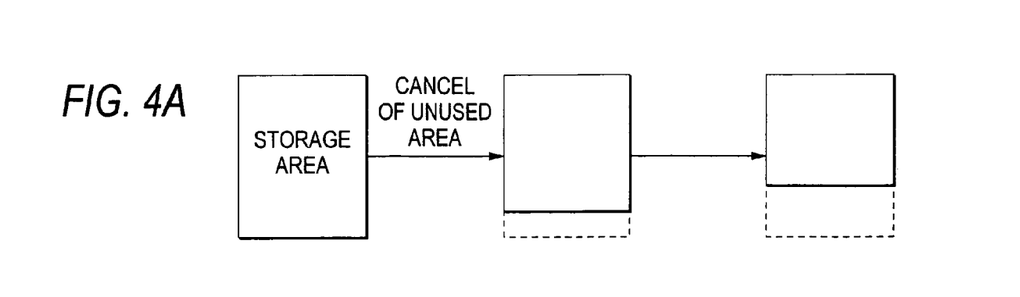
FIGS. 4A to 4C are schematic representations of the operation to show setting change examples of the service providing contents by a control section 26 of an image accumulation server 11.

FIGS. 4A to 4B are schematic representations of the operation to show setting change examples of the service providing contents by the control section 26 of the image accumulation server 11. In the first example shown in FIG. 4A, if a predetermined amount of unused area exists after the expiration of the predetermined time period, the storage area of the customer is reduced and the usage charge is not collected in the next predetermined time period (free of charge). In this case, the usage charge is canceled by the unused storage area and the unused area is used as an equivalent. If the storage area in which the image data is retained is small and the use frequency is low, the storage area is decreased gradually every predetermined time period. Accordingly, the registered number of customers can be increased in a predetermined record capacity in such a manner that the reduced storage area is allocated to any other customer, so that the use efficiency of the resources of the image storage section 22 in the image accumulation server 11 can be enhanced and the cost load on the customer can also be lightened.

Figure 4B:
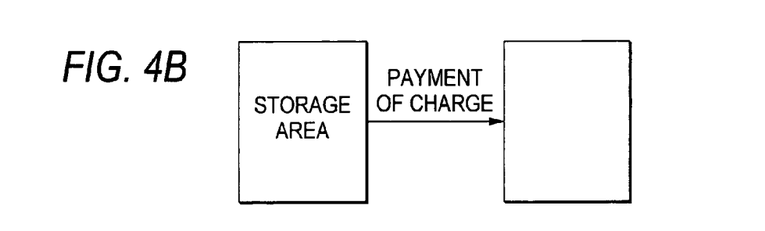

In the second example shown in FIG. 4B, when the customer pays the usage charge at the expiration of the predetermined time period, the storage area in the next predetermined time period is maintained. If it is scheduled that the allocated storage area will be used to retain image data, etc., in the future, the customer can pay the usage charge, thereby reserving the storage area. The usage charge can also be increased for increasing the storage area. Since the trader can get an equivalent as the customer uses the service, the customer frequently using the service is treated favorably, whereby the trader can make a profit while providing the service meeting the customer's requirement.

Figure 4C:
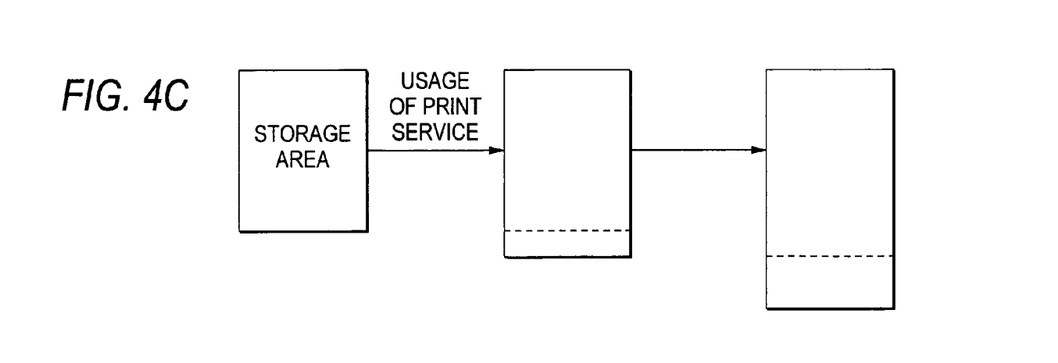

In the third example shown in FIG. 4C, if the customer uses print service, etc., of the image data retained in the image accumulation server 11 at the expiration of the predetermined time period, the storage area is increased in response to the use frequency, etc. In this case, the customer can obtain a bonus of increasing the area by using the service. The next and later usage charges can also be decreased or made free of with the storage area maintained intact.

As setting change examples of the service providing contents, other conditions can also be changed in such a manner that the service charge of print service, etc., is decreased or that the predetermined time period for updating the setting is changed so as to prolong the expiration date of the paid usage charge, etc.

Figure 5:
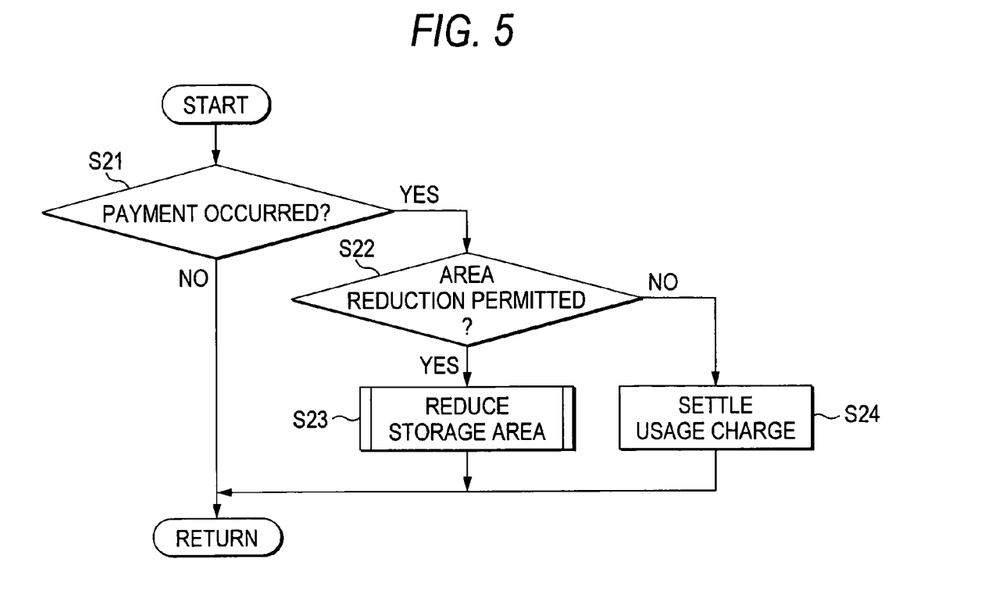
FIG. 5 is a flowchart to show a procedure concerning a reduction in a storage area after the expiration of a predetermined time period.
Figure 6:
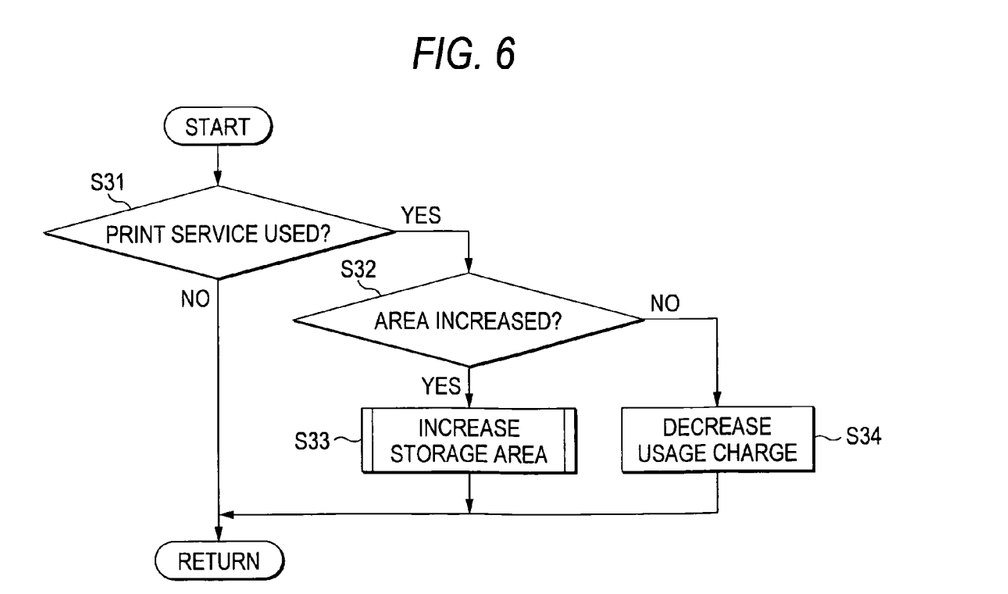
FIG. 6 is a flowchart to show a procedure concerning change in the storage area if print service is used.

FIG. 5 is a flowchart to show a procedure concerning a reduction in the storage area after the expiration of the predetermined time period. FIG. 6 is a flowchart to show a procedure concerning change in the storage area if print service is used. In FIG. 5, whether or not payment of the usage charge concerning the image accumulation service, for example, at the expiration of the predetermined time period occurs is determined (step S21). If payment occurs, as described above, the customer is notified of the service use situation and is inquired if a part of the unused area may be reduced or the customer pays the usage charge and customer's response of permitting area reduction is determined (step S22). If the response of permitting area reduction is received as the selection result of the customer operating the operation input section 36 of the terminal 12, the storage area is reduced (step S23). On the other hand, if the response of paying the usage charge without reducing the storage area is received as the selection result of the customer, the usage charge concerning the image accumulation service is settled (step S24). To settle the usage charge, various methods such as online settlement via a network, etc., a credit card, electronic money, and electronic bank transfer can be used.

In FIG. 6, when the predetermined time has elapsed, etc., whether or not print service was used in the time period is determined (step S31). If the service was used, as described above, the customer is notified of the service use situation and is inquired if the storage area is increased or the usage charge is decreased and customer's response of wanting area increase is determined (step S32). If the response of wanting area increase is received as the selection result of the customer, the storage area is increased (step S33). On the other hand, if the response of wanting a decrease in the usage charge without increasing the storage area is received as the selection result of the customer, the usage charge concerning the image accumulation service is decreased or is made free of (step S34).

Thus, the more appropriate contract contents can be set in the later time period in such a manner that the storage area is reduced according to the use history of the image accumulation service for each customer and the customer's desire, whereby it is made possible to execute service operation profitable for both the trader and the customer.

Figure 7:
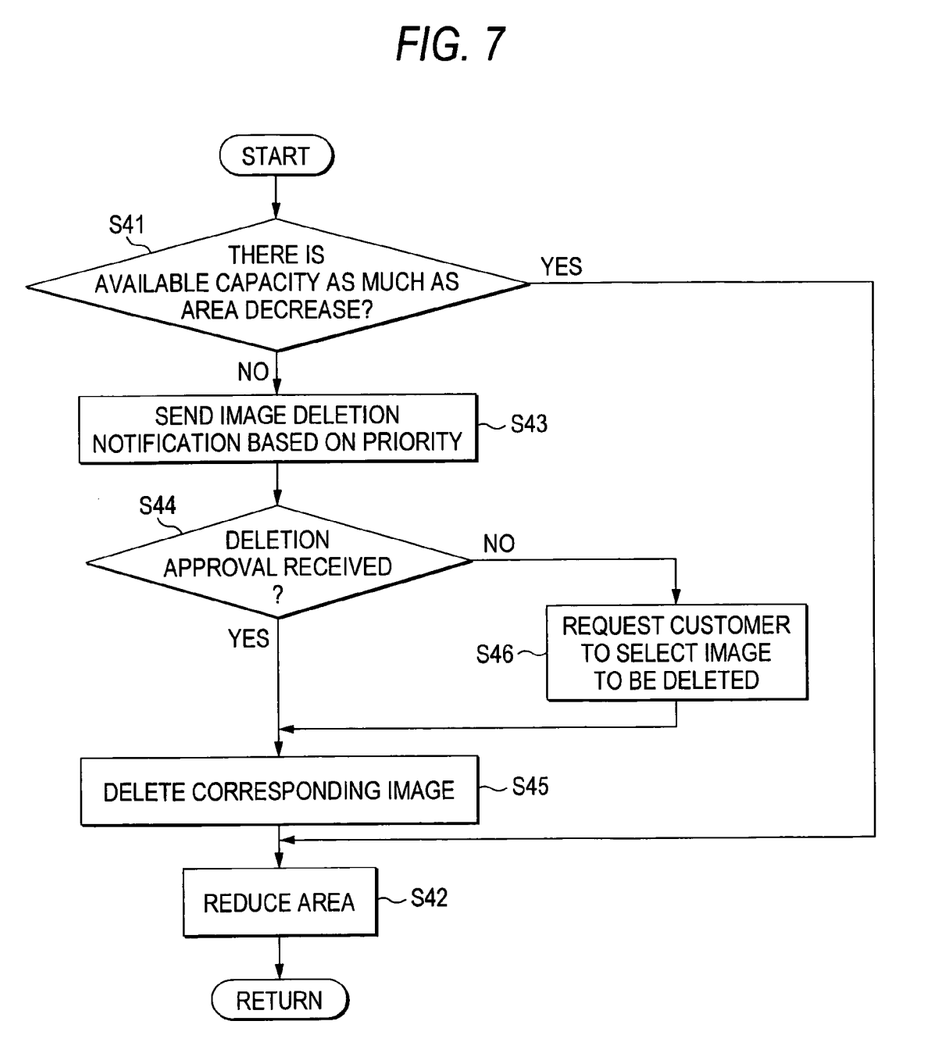
FIG. 7 is a flowchart to show a procedure for reducing the storage area.

FIG. 7 is a flowchart to show a procedure for reducing the storage area. To reduce the storage area, the storage area management section 23 of the control section 26 determines whether or not a predetermined available capacity exists as area decrease (step S41). If available capacity exists, the area is reduced as much as the capacity (step S42). If no available capacity exists, the image data to be deleted is extracted based on the preset priority and the customer is notified of image deletion to receive approval as to whether or not the image data may be deleted (S43). The priority is previously selected from among the order of the image data retention dates, the ascending order of the use frequencies of reference, download, etc., and the like.

Whether or not response of deletion approval is received from the customer is determined (step S44). If the response of deletion approval is received as the selection result of the customer operating the operation input section 36 of the terminal 12, the image data is deleted (step S45) and then the area is reduced as much as the predetermined capacity (step S42). If the response of deletion approval is not received, a request for selecting image data which may be deleted is transmitted to the terminal 12 (step S46). Selection response of the image to be deleted is received from the customer and the corresponding image data is deleted (step S45) and then the area is reduced as much as the predetermined capacity (step S42).

As described above, in the image storage system of the embodiment, a predetermined amount of storage area is reserved for each customer, the customer information of the customer is read at the expiration of a predetermined time period such as the contract time period, the service providing contents of the capacity of the storage area, the usage charge, etc., in the next predetermined time period are determined in response to the use history of the retention history of the image data, the service order history of print service, etc., and the customer is notified of the service providing contents. In response to the customer's selection, for example, if the use area in which the image is actually retained is small as compared with the currently setup storage area, the storage area is decreased in the next predetermined time period. Accordingly, the usage charge for the decrease in the retention capacity of the image data can be reduced or made free of in the next predetermined time period and the unused storage area can be canceled as an equivalent for the usage charge, so that the cost load on the customer can be lightened and area allocation for image retention can be conducted efficiently and the use efficiency of the resources of the image storage section in the image accumulation server can be enhanced.

In addition to deletion of the storage area not used and wasted as described above, if the customer uses print service, etc., the storage area can also be increased or the usage charge can also be decreased; appropriate service responsive to the use situation of each customer can be provided in such a manner that a bonus is given to the customer. The trader can obtain customers and get an equivalent by providing retention management, print service, processing service, etc., of the image data.

Figure 8:
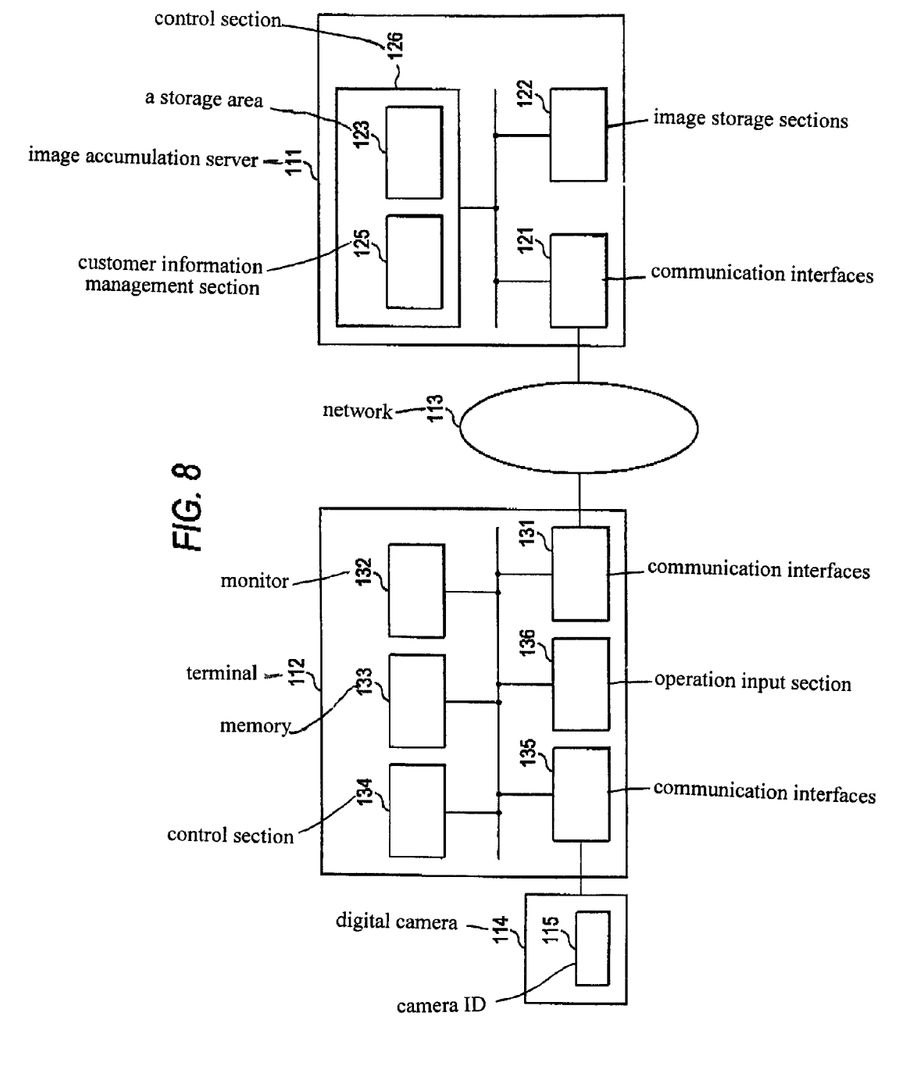
FIG. 8 is a block diagram to show the schematic configuration of an image accumulation apparatus according to one embodiment of the invention.

FIG. 8 is a block diagram to show the schematic configuration of an image accumulation apparatus according to one embodiment of the invention. The embodiment provides an example of a system wherein data of an image photographed by a digital camera is transferred through a network to a server for retention.

The image accumulation apparatus of the embodiment has an image accumulation server 111 for accumulating image data. The image accumulation server 111 is connected to a terminal 112 of a personal computer used by the user, an acceptance terminal installed in a shop, etc., or the like through a network 113 such as the Internet of a communication line. A digital camera 114 of an image input machine is connected to the terminal 112 and picked up image data is transferred to the terminal 112.

An image accumulation server 111 comprises a communication interface 121 being connected to a network 113 for conducting data communications, an image storage section 122 for accumulating and retaining image data, and a control section 126 for controlling the sections. The control section 126 has a storage area management section 123 for setting and managing a storage area for each customer in the image storage section 122 and a customer information management section 125 for setting, changing, managing, etc., the customer information.

The terminal 112 comprises a communication interface 131 being connected to the network 113 for conducting data communications, a monitor 132 of a liquid crystal display panel (LCD), etc., for displaying the operation state, etc., memory 133 for temporarily storing image data, etc., a control section 134 for controlling the sections, a communication interface 135 being connected to the digital camera 114 for conducting data communications, and an input operation section 136 for entering an operation command, etc. The digital camera 114 contains a camera ID 115 as machine information and image data is transmitted together with the camera ID 115 to the terminal 112 to which the digital camera 114 is connected. Various interfaces and protocols of USB, IEEE1394, Bluetooth, etc., can be used to conduct communications between the terminal 112 and the digital camera 114.

In the embodiment, to transfer image data to the image accumulation server 111 for retention particularly in the initial state of customer registration or when customer information is changed, the camera ID 115 of the digital camera 114 connected to the terminal 112 is detected, whereby the model of the digital camera 114 is determined in the image accumulation server 111 or the terminal 112 and the maximum number of pixels of the image data transferred to the image accumulation server 111 is grasped. The number of images corresponding to the image data that can be retained at the minimum is set in a storage area management section 123 of the image accumulation server 111, and from the number of images and the maximum number of pixels, the necessary data capacity is calculated and a storage area of an image storage section 122 is reserved.

When the customer to receive image accumulation service purchases a digital camera or signs up for receiving the service, if he or she makes user registration in the trader, customer information is stored by a customer information management section 125. The customer information includes not only personal information of the name, address, etc., of the customer, but also information for each customer concerning the image input machine and image accumulation service providing, such as the model and serial number of the used digital camera and the setup number of images that can be retained. The image data input from the digital camera 114 and transferred through the network 113 from the terminal 112 is recorded and retained in the storage area set for each customer in the image storage section 122 of the image accumulation server 111.

The model of the digital camera 114 is determined, whereby the maximum resolution (number of pixels) to the minimum resolution of picked-up image data can be known from the number of pixels of the image pickup device installed in the digital camera 114 and the like. Since the capacity per image is roughly determined from the resolution, the compression ratio, etc., of the image data, the capacity of the storage area required for retaining a predetermined number of images in the image storage section 122 is determined considering the maximum capacity.

The model is determined by the camera ID 115 held in the camera. In addition, for example, in image data conforming to Exif standard in DCF of image file standard used with most digital cameras, machine information, etc., of the camera photographing the image is recorded in a tag in a header part as attached information and thus the header part of the image data is read in the image accumulation server 111 or the terminal 112, whereby the model can be determined. It is also possible to read image data of one image, for example, as a sample and determine the resolution and the capacity of the image data to be retained.

Figure 9:
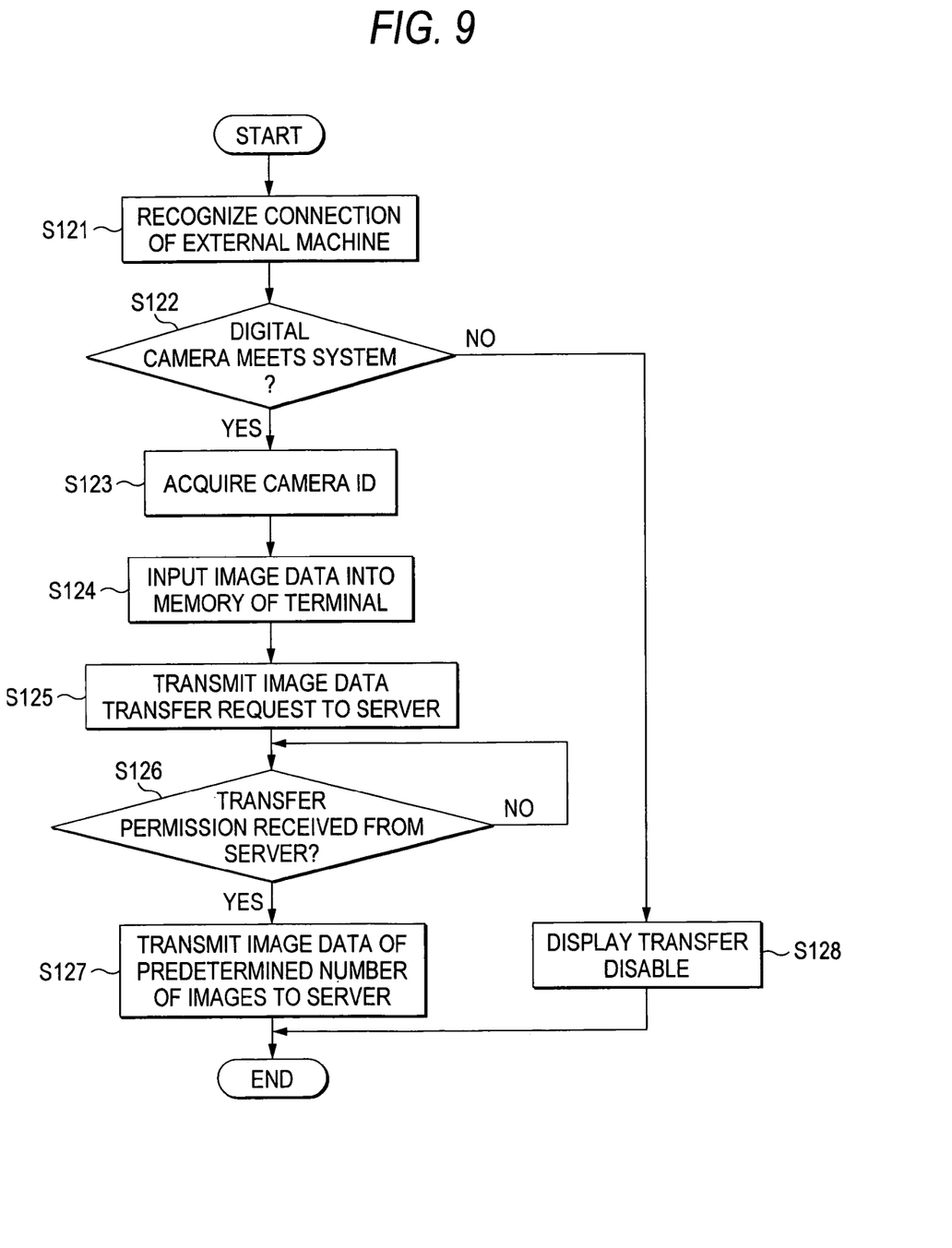
FIG. 9 is a flowchart to show a processing procedure in a terminal.
Figure 10:
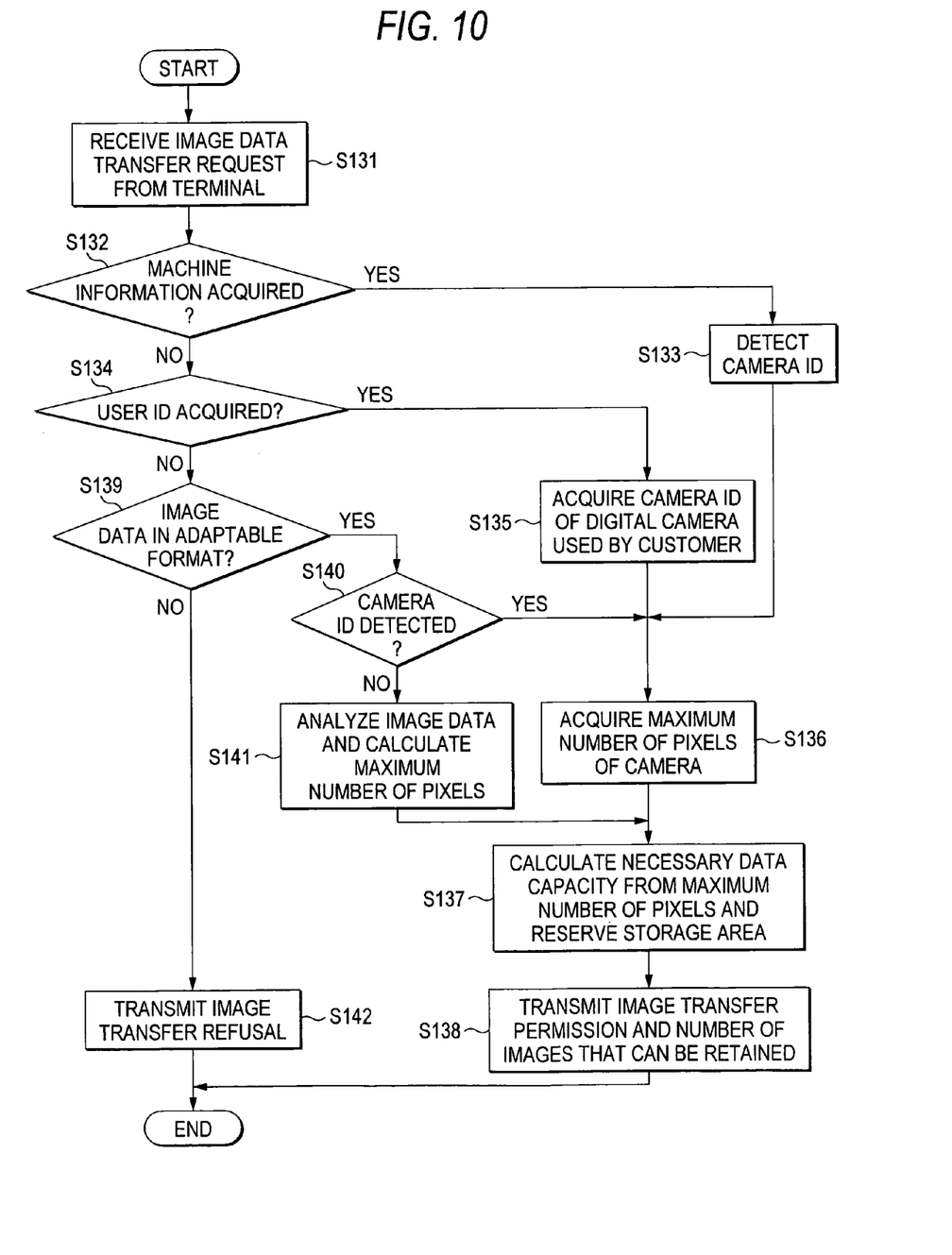
FIG. 10 is a flowchart to show a processing procedure in an image accumulation server.

Next, the operation of the image accumulation apparatus of the embodiment will be discussed. FIG. 9 is a flowchart to show a processing procedure in the terminal and FIG. 10 is a flowchart to show a processing procedure in the image accumulation server. The operation description to follow centers around the operation of control sections 134 and 126 of the terminal 112 and the image accumulation server 111.

When the digital camera 114 is connected to the terminal 112, the connected external machine is recognized (step S121) and whether or not it is a digital camera meeting the system is determined (step S122). If the connected digital camera meets the system, the camera ID 115 is acquired (step S123) and the image data stored in the digital camera 114 is input to the memory 133 (step S124). A request to transfer image data is transmitted to the image accumulation server 111 (step S125) and a wait is made until reception of transfer permission from the image accumulation server 111 (step S126). At this time, in the transfer request, the camera ID 115 of the connected digital camera 114 is contained as machine information and the customer's user ID previously registered is contained as customer information for transmission.

Upon reception of transfer permission from the image accumulation server 111 (step S126), the image data of a predetermined number of images stored in the memory 133 is transmitted to the image accumulation server 111. The number of images corresponding to image data that can be retained in the image accumulation server 111 by one customer is set, for example, at the user registration time of the customer and is sent to the terminal 112 together with the transfer permission. If the image data exceeding the number of images that can be retained exists in the terminal 112 or is sent to the image accumulation server 111, an image selection screen is prepared in the terminal 112 or the image accumulation server 111 and is displayed on the monitor 132 of the terminal 112, prompting the customer to select a predetermined number of images to be retained.

If it is not determined at step S122 that the connected digital camera 114 meets the system, transfer disable is displayed on the monitor 132, notifying the user that the digital camera is a model not meeting the system and image transfer cannot be executed.

If the model of the digital camera 114 cannot be determined in the terminal 112 or the image data previously stored in the memory 133 is transferred to the image accumulation server 111 for retention without connecting the digital camera 114, a small amount of image data of one image, etc., is transmitted to the image accumulation server 111 as a sample and whether or not the image data can be handled in the server is determined. It the camera ID can be determined in the terminal 112 from the attached information to image data, the camera ID corresponding to the image data may be transmitted to the image accumulation server 111.

In the image accumulation server 111, upon reception of the request to transfer image data from the terminal 112 (step S131), first whether or not the transfer request contains machine information of the camera ID, etc., is determined (step S132). If the transfer request contains machine information, the camera ID of the digital camera 114 connected to the terminal 112 is detected from the machine information (step S133).

If the image data transfer request does not contain machine information, whether or not it contains the customer's user ID previously registered is determined (step S134). If the transfer request contains the user ID and the model of the digital camera used by the customer can be determined, the camera ID of the digital camera used by the customer is acquired from the customer information stored in the customer information management section 25 (step S135).

If the camera ID is detected from the machine information or the customer information and the model of the image data transmission source can be determined as described above, the storage area management section 123 references specification information previously recorded in the image accumulation server 111 and acquires the maximum number of pixels of image data for the digital camera (step S136). The data capacity required for retaining a predetermined number of images such as the preset number of images that can be retained is calculated from the maximum number of pixels acquired and a storage area is reserved in the image storage section 122 (step S137). Next, image data transfer permission and the number of images that can be retained are transmitted to the terminal 112 (step S138). Then, upon reception of the image data transferred from the terminal 112, the image data is retained in the storage area reserved in the image storage section 122.

If the image data transfer request does not contain the user ID, a request to send image data of one image is transmitted to the terminal 112, the image data of one image is received from the terminal 112, and whether or not the image data is image data in an adaptable format is determined (step S139). If the transferred image data is in the adaptable format in the image accumulation server 111, the header part of the image data is referenced and whether or not it is possible to detect the camera ID is determined (step S140). If the camera ID is detected, control goes to steps 3136 to S138 and likewise a storage area of the data capacity as much as the predetermined number of images responsive to the model of the digital camera is reserved and image data transfer permission is transmitted.

If the camera ID cannot be detected at step S140, the image data is analyzed and the maximum number of pixels of the transferred image data is calculated from the attached information, the data format, the data capacity, the compression ratio, etc., of the image (step S141). Control goes to steps S137 and S138 and likewise a storage area of the data capacity as much as the predetermined number of images is reserved from the maximum number of pixels and image data transfer permission is transmitted.

If it is not determined at step S139 that the transferred image data is in an adaptable format in the image accumulation server 111, image transfer refusal is transmitted to the terminal 112 (step S142). Upon reception of the image transfer refusal in the terminal 112, transfer disable is displayed on the monitor 132, notifying the user that the digital camera is a model not meeting the system and image transfer cannot be executed.

Thus, in the image accumulation apparatus of the embodiment, the number of images that can be retained is set for each customer, the necessary data capacity for storing the image data as much as the number of images that can be retained at the minimum is calculated from the maximum number of pixels of the image data, and a storage area is reserved. At this time, the maximum number of pixels of the retained image data is found from the camera ID of the digital camera of the image transfer source connected to the terminal, etc. Thus, the customer need not calculate the capacity of the image data and can use the image accumulation service based on the number of images that can be understood easily by intuition. The optimum storage area capacity is set in response to the maximum number of pixels of the connected digital camera, etc., whereby area allocation for image retention can be conducted efficiently and the use efficiency of the resources of the image storage section in the image accumulation server can be enhanced while a predetermined number of retained images are ensured.

Not only the model of the digital camera, but also information unique to the camera such as the serial number can be carried in the machine information. If such unique information is held in memory, firmware, etc., of the digital camera, the serial number of the camera is read and recorded corresponding to the user ID at the user registration time, whereby the time taken for the user registration can be lessened drastically and user authentication can also be conducted simply by connecting the digital camera to the terminal at the image retention time; the operability at the use time can be enhanced for ease of use.

If the customer uses more than one-model of camera or purchases a new camera, that is, if the machine information of the customer information registered in the customer information management section differs from the newly acquired machine information, the capacity of the storage area in the image accumulation server is adjusted and is again set in response to the model of the connected digital camera based on the currently acquired machine information. Accordingly, the trader providing the image accumulation service can guarantee the preset number of images that can be retained, and can allocate a large-capacity storage area to the customer purchasing a high-resolution camera, thereby providing the appropriate service responsive to the use situation of each customer.

As described above, according to the invention, there can be provided the image storage system for making it possible to finely and appropriately set and manage the capacity of the storage area, charge payment, and others in response to the use situation, etc., of the customer.

Further, according to the invention, there can be provided the image accumulation apparatus for making it possible to appropriately set the capacity of a storage area in response to the type of machine connected, the resolution of the transferred image data, etc., and ensure a predetermined number of retained images.

What is claimed is:

1. An image storage system comprising:
an image accumulation server including an image storage section for recording image information, the image storage system for storing image information transferred via a communication line in the image storage section,
wherein the image accumulation server has a storage area management section for managing a storage area of the image storage section and a customer information management section for managing customer information concerning a customer making a request for storing the image information wherein the customer information is for a single customer,
wherein the storage area management section sets the storage area so as to reserve a predetermined capacity for one customer as the initial state to store the image information and after the expiration of a predetermined time period, again sets the service providing contents for each customer including the storage area and usage charge in the next predetermined time period in response to the customer information,
wherein the storage area management section uses an image-related service order history including at least one of image information print service for printing the images stored in the storage area of the customer and image processing service for processing the images stored in the storage area of the customer as the customer information and if the customer uses the at least one of the image information print service for printing any of the images stored in the storage area of the customer and the image processing service for processing any of the images stored in the storage area of the customer after the expiration of the predetermined time period, the storage area management section increases the storage area in the next predetermined time period, and
wherein the storage area management section uses a retention history of image information as the customer information, the retention history of image information comprises a value indicating a number of stored images in the predetermined time period.

2. The image storage system according to claim 1, wherein the storage area management section uses the retention history of image information as the customer information and if the used area in which image information is retained is smaller than the storage area, the storage area management section decreases the storage area in the next predetermined time period and reduces or makes free of the usage charge in the next predetermined time period.

3. The image storage system according to claim 2, wherein the retention history of image information comprises a value indicating a maximum number of images stored in the past and a value indicating a minimum number of images stored in the past, wherein the values indicating said maximum number and said minimum number are determined based on a number of images stored in a predetermined time interval.

4. The image storage system according to claim 3, wherein a value indicating an average number of images stored for the predetermined time interval is obtained from the maximum and minimum number and wherein the retention history of image information comprises the value indicating the average number of images which is the value indicating the number of stored images in the predetermined time period.

5. The image storage system according to claim 4, wherein based on the value indicating the number of images stored in the predetermined time period, capacity of the storage area is determined.

6. The image storage system according to claim 4, wherein, after the expiration of a predetermined time period, the storage area management section sets the service providing contents for each customer comprising the storage area and usage charge in response to the value indicating the number of images stored in the predetermined time periods.

7. The image storage system according to claim 1, wherein the storage area management section uses a retention history of image information as the customer information and after the expiration of the predetermined time period, decreases the storage area in the next predetermined time period as much as the capacity corresponding to the usage charge.

8. The image storage system according to claim 1, wherein the customer information management section updates the customer information based on the service providing contents again set with at least either of the storage area and the usage charge changed by the storage area management section.

9. The image storage system according to claim 1, wherein after the expiration of the predetermined time period, the storage are management section determines to decrease the predetermined storage capacity and the usage charge when the value indicates that the number of stored images is less than a threshold number of images that are stored in the predetermined storage capacity.

10. The image storage system according to claim 1, wherein the customer information relates to the single customer and comprises:
the retention history of image information that further includes maximum file capacity of one file among files written in past, minimum file capacity of one file among files written in the past, and average capacity of file written in the past, and
the image-related service order history that includes number of times the customer accessed the storage area of the image storage section dedicated to the customer and number of times the customer used the image information print service to print the images stored the storage area of the image storage section dedicated to the customer.

11. The image storage system according to claim 10, wherein the image-related service order history further includes number of times the customer used image processing services to process the images stored the storage area of the image storage section dedicated to the customer.

12. An image storage system comprising:
an image accumulation server including an image storage section for recording image information, the image storage system for storing image information transferred via a communication line in the image storage section,
wherein the image accumulation server has a storage area management section for managing a storage area of the image storage section and a customer information management section for managing customer information concerning a customer making a request for storing the image information wherein the customer information is for a single customer, and wherein the storage area management section sets the storage area so as to reserve a predetermined capacity for one customer as the initial state to store the image information and after the expiration of a predetermined time period, again sets the service providing contents for each customer including the storage area and usage charge in the next predetermined time period in response to the customer information, wherein the storage area management section uses information regarding use of a print service by the customer for printing the images stored in the storage area of the customer and use of image processing service by the customer for processing the images stored in the storage area of the customer as the customer information, and wherein, if the customer uses the print service for printing any of the images stored in the storage area of the customer and the processing service for processing any of the images stored in the storage area of the customer, after the expiration of the predetermined time period, the storage area management section increases the storage area of the customer in the next predetermined time period, wherein the storage area management section uses a retention history of image information as the customer information, the retention history of image information comprises a value indicating a number of stored images in the predetermined time period.

13. The image storage system according to claim 12, wherein after the expiration of the predetermined time period, the storage are management section determines to decrease the predetermined storage capacity and the usage charge when the value indicates that the number of stored images is less than a threshold number of images that are stored in the predetermined storage capacity.

14. The image storage system according to claim 12, wherein the customer information relates to the single customer and comprises:

the retention history of image information that further includes maximum file capacity of one file among files written in past, minimum file capacity of one file among files written in the past, and average capacity of files written in the past, and the information regarding the use of the print service and the use of the image processing service includes number of times the customer accessed the storage area of the image storage section dedicated to the customer and number of times the customer used the image information print service to print the images stored the storage area of the image storage section dedicated to the customer.

15. The image storage system according to claim 14, wherein the information regarding the use of the print service and the use of the image processing service further includes number of times the customer used the image processing service to process the images stored the storage area of the image storage section dedicated to the customer.

* * * * *